United States Patent
Evangelinos et al.

(10) Patent No.: US 9,870,340 B2
(45) Date of Patent: Jan. 16, 2018

(54) MULTITHREADING IN VECTOR PROCESSORS

(71) Applicant: International Business Machines Corporation, Armonk, NY (US)

(72) Inventors: Constantinos Evangelinos, Andover, MA (US); Changhoan Kim, Ossining, NY (US); Ravi Nair, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 185 days.

(21) Appl. No.: 14/672,568

(22) Filed: Mar. 30, 2015

(65) Prior Publication Data

US 2016/0292128 A1    Oct. 6, 2016

(51) Int. Cl.
| | |
|---|---|
| *G06F 15/00* | (2006.01) |
| *G06F 7/38* | (2006.01) |
| *G06F 9/00* | (2006.01) |
| *G06F 9/44* | (2006.01) |
| *G06F 15/80* | (2006.01) |
| *G06F 9/30* | (2006.01) |
| *G06F 9/32* | (2006.01) |
| *G06F 9/38* | (2006.01) |

(52) U.S. Cl.
CPC ...... *G06F 15/8076* (2013.01); *G06F 9/30036* (2013.01); *G06F 9/30189* (2013.01); *G06F 9/321* (2013.01); *G06F 9/3851* (2013.01); *G06F 15/8053* (2013.01); *G06F 15/8084* (2013.01)

(58) Field of Classification Search
None
See application file for complete search history.

(56) References Cited

U.S. PATENT DOCUMENTS

| | | | |
|---|---|---|---|
| 6,073,159 A | 6/2000 | Emer et al. | |
| 6,968,445 B2 | 11/2005 | Hokenek et al. | |
| 8,108,859 B2 * | 1/2012 | Yokoi | G06F 9/3851 711/125 |
| 8,892,849 B2 * | 11/2014 | Hokenek | G06F 9/3851 712/7 |
| 9,223,709 B1 * | 12/2015 | O'Bleness | G06F 12/0864 |

(Continued)

FOREIGN PATENT DOCUMENTS

CN    102156637 A    8/2011

OTHER PUBLICATIONS

Gulati (Performance Study of a Multithreaded Superscalar Microprocessor, Feb. 1996, pp. 291-301).*

(Continued)

*Primary Examiner* — George Giroux
(74) *Attorney, Agent, or Firm* — Cantor Colburn LLP

(57) ABSTRACT

In one embodiment, a system includes a processor having a vector processing mode and a multithreading mode. The processor is configured to operate on one thread per cycle in the multithreading mode. The processor includes a program counter register having a plurality of program counters, and the program counter register is vectorized. Each program counter in the program counter register represents a distinct corresponding thread of a plurality of threads. The processor is configured to execute the plurality of threads by activating the plurality of program counters in a round robin cycle.

15 Claims, 8 Drawing Sheets

(56) References Cited

U.S. PATENT DOCUMENTS

| | | | |
|---|---|---|---|
| 2005/0044319 A1* | 2/2005 | Olukotun | G06F 9/30032 |
| | | | 711/118 |
| 2005/0050395 A1 | 3/2005 | Kissell | |
| 2005/0055541 A1* | 3/2005 | Aamodt | G06F 9/30101 |
| | | | 712/217 |
| 2005/0289299 A1* | 12/2005 | Nunamaker | G06F 9/30036 |
| | | | 711/122 |
| 2008/0077921 A1* | 3/2008 | Chaudhary | G06F 9/52 |
| | | | 718/100 |
| 2008/0313425 A1 | 12/2008 | Le et al. | |
| 2009/0182987 A1 | 7/2009 | Mejdrich et al. | |
| 2010/0281234 A1 | 11/2010 | Ahmed et al. | |
| 2011/0320788 A1 | 12/2011 | Assarpour | |
| 2014/0047214 A1 | 2/2014 | Fleischer et al. | |
| 2014/0372731 A1* | 12/2014 | Nystad | G06F 9/3851 |
| | | | 712/207 |

OTHER PUBLICATIONS

Disclosed Anonymously, "Configurable Level-1 Caches that can function as Queues, Streams, and Vector Registers", IP.com IPCOM000199826D, Sep. 17, 2010, 7 pgs.

Disclosed Anonymously, "Meta-Core Processors", IP.com IPCOM000199834D, Sep. 17, 2010, 7 pgs.

Siemens AG et al., "Register Adressing in Customizable Processor Generation System", IP.com IPCOM000138502D, Original Pub. Date: Aug. 25, 2006, IP.com Pub. Date: Jul. 21, 2006; 5 pgs.

* cited by examiner

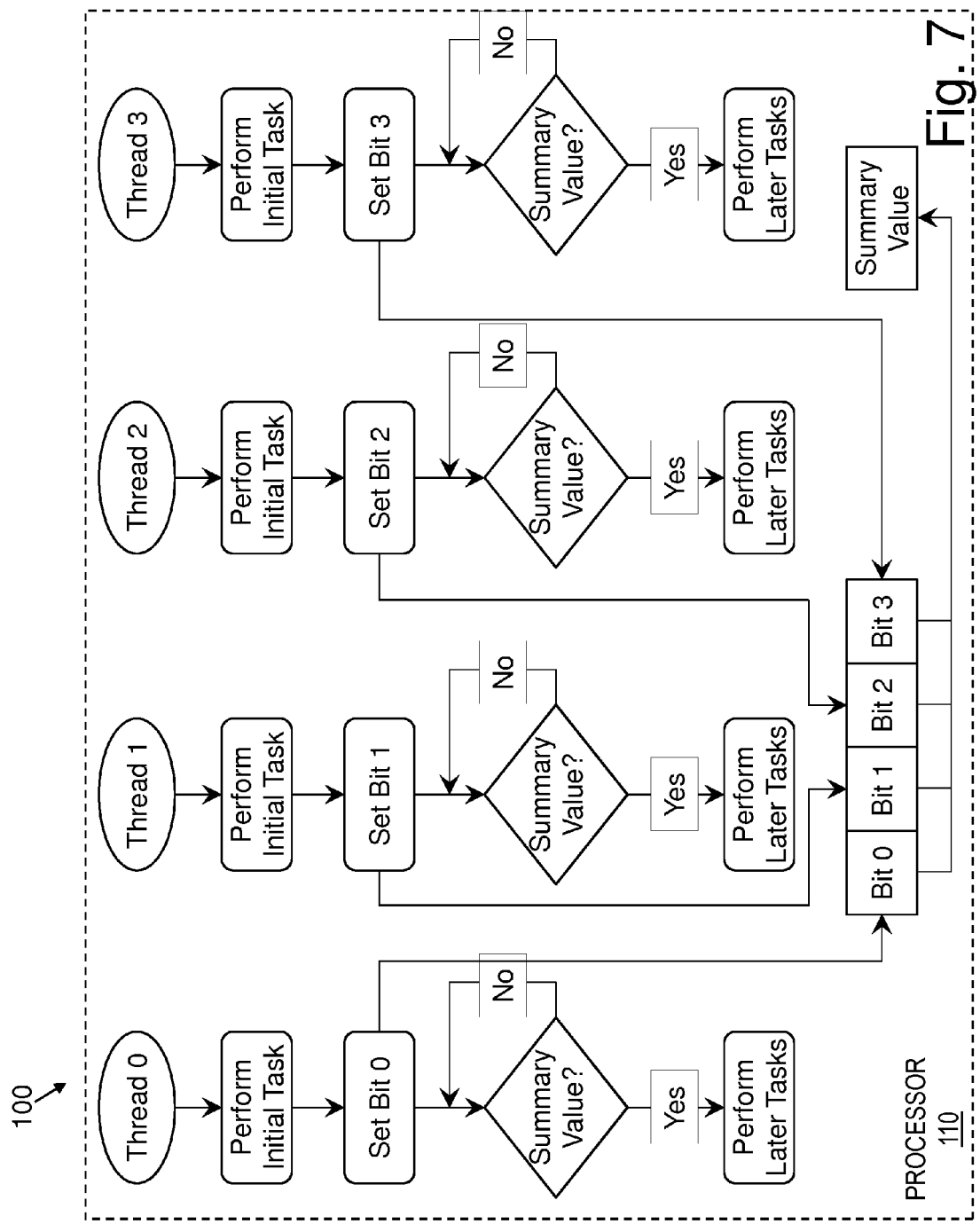

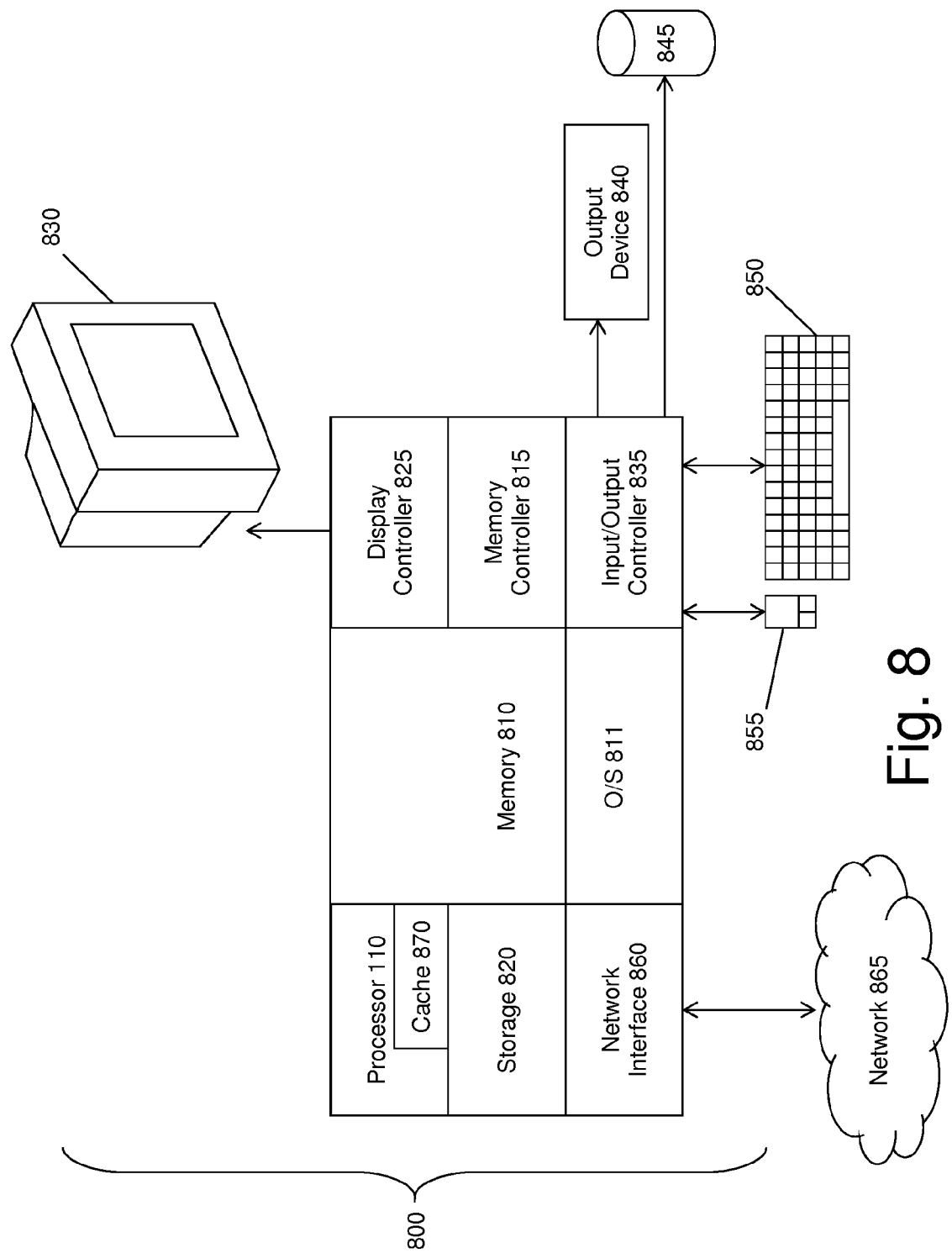

MULTITHREADING IN VECTOR PROCESSORS

STATEMENT OF GOVERNMENT INTEREST

This invention was made with Government support under Contract No.: B599858 awarded by Department of Energy. The Government has certain rights in this invention.

BACKGROUND

Various embodiments of this disclosure relate to vector processors and, more particularly, to multithreading in vector processors.

A vector processor is a computer processor, or central processing unit (CPU), that executes instructions to operate on vectorized data, which is data maintained in a vector. A vector is a contiguous data set that holds multiple data elements, and a vector is generally stored in a vector register. A vector's length (i.e., the number of data elements the vector includes) may be determined by the size of the vector register maintaining the vector. For example, some vector registers allow vectors of length 32, which have 32 data elements. A vector register file on a vector processor maintains one or more vector registers on which the vector processor can operate.

There are two general categories of vector processors. In the first category, which includes many older processors, the vector processor is able to operate on only one data element of the vector at a time. An example of such a vector processor is the Cray-1 processor. The second category, however, is defined by an ability to operate on all data elements of a vector simultaneously. The vector units in most microprocessors belong to this second category, employ vectors that are generally smaller in length (e.g., lengths of 2, 4, 8 or 16 at most) than those of the first category, and are often referred to as single-instruction-multiple-data (SIMD) units. Formally, however, the term SIMD is more generic and encompasses both categories of vector processors.

SUMMARY

In one embodiment of this disclosure, a system includes a processor having a vector processing mode and a multithreading mode. The processor is configured to operate on one thread per cycle in the multithreading mode. The processor includes a program counter register having a plurality of program counters, and the program counter register is vectorized. Each program counter in the program counter register represents a distinct corresponding thread of a plurality of threads. The processor is configured to execute the plurality of threads by activating the plurality of program counters in a round robin cycle.

In another embodiment, a computer-implemented method includes storing in a program counter register a plurality of program counters, where the program counter register is vectorized. Each program counter in the program counter register represents a distinct corresponding thread of a plurality of threads. The method further includes executing, by a processor, the plurality of threads by activating the plurality of program counters in a round robin cycle. The processor has a vector processing mode and a multithreading mode, and the processor is configured to operate on one thread per cycle in the multithreading mode.

In yet another embodiment, a computer program product for multithreading in a vector processor includes a computer readable storage medium having program instructions embodied therewith. The program instructions are executable by a processor to cause the processor to perform a method. The method includes storing in a program counter register a plurality of program counters, where the program counter register is vectorized. Each program counter in the program counter register represents a distinct corresponding thread of a plurality of threads. The method further includes executing the plurality of threads by activating the plurality of program counters in a round robin cycle. The processor has a vector processing mode and a multithreading mode, and the processor is configured to operate on one thread per cycle in the multithreading mode.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 7 is a block diagram of synchronization in the multithreading system, according to some embodiments of this disclosure; and FIG. 8 is a block diagram of a computing device for implementing some or all aspects of the multithreading system, according to some embodiments of this disclosure.

DETAILED DESCRIPTION

Various embodiments of this disclosure are multithreading systems, methods, and computer program products that implement a multithreading mode on vector processors. More specifically, some embodiments of this disclosure apply to vector processors that operate on vector data elements sequentially, and can operate on no more than a single data element of each vector at a time. In other words, in some embodiments, the vector processor is unable to perform parallel vectorized operations. As a result, some embodiments may achieve multithreading in time on a vector processor that cannot operate on all vector elements simultaneously.

Figure 1:
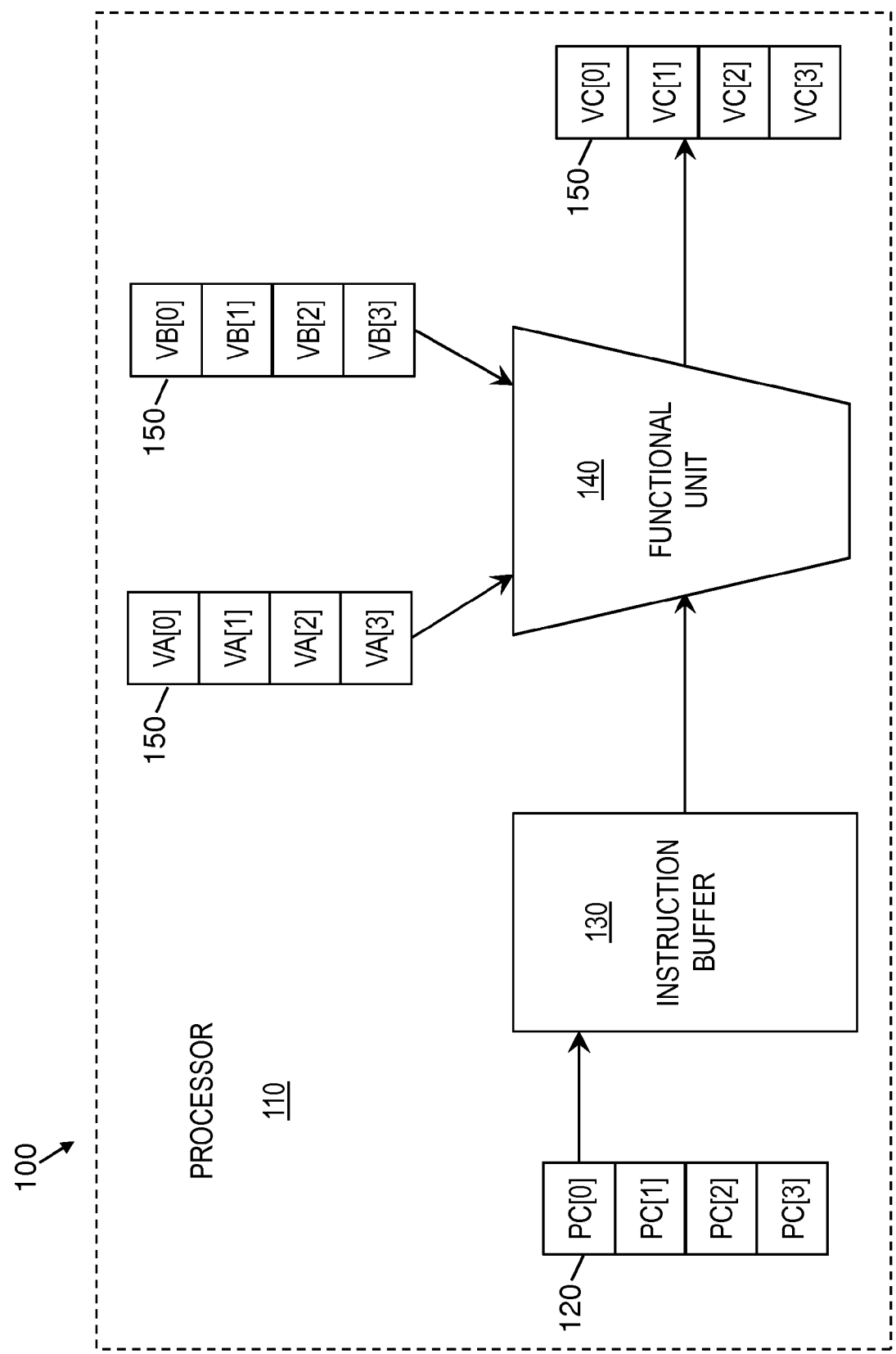
FIG. 1 is a block diagram of a multithreading system embodied in a processor, according to some embodiments of this disclosure.

FIG. 1 is a block diagram of a multithreading system 100 embodied in a processor 110, according to some embodiments of this disclosure. As shown, the processor 110 may include a program counter register 120, an instruction buffer 130, at least one functional unit 140, and one or more vector registers 150. The program counter register 120 may be vectorized. The instruction buffer 130 may include a set of instructions executable by the processor 110, where the program counter register 120 may indicate which instructions in the instruction buffer to execute. The instruction buffer 130 may take various forms. For example, and not by way of limitation, the instruction buffer 130 may be a cache or a list in memory.

It will be understood that FIG. 1 does not necessarily illustrate every component of the processor 110 and that the processor may include additional components not illustrated. It will be further understood that, although the vectors of FIG. 1 and other figures of this disclosure contain only four data elements each, this quantity is chosen for illustrative purposes. In practice, a vector may contain various quantities of data elements (e.g., 32, 64) based on implementation.

The processor 110 may be a vector processor configured to operate on data elements within a single vector sequentially. In other words, in some embodiments, the processor 110 does not function like the single-instruction-multiple-data (SIMD) units that operate on all data elements of a vector simultaneously, and may be unable to simultaneously operate on multiple data elements of a vector.

Conventionally, the program counter is stored in a register and interpreted as a single, scalar value. In contrast, according to some embodiments, the program counter register 120 may be vectorized. Each data element within the vectorized program counter register 120 may behave as a program counter for a particular thread. Thus, the various program counters in the program counter register 120 may have different values, indicating different instructions to be performed for the respective threads. In some embodiments, the number of threads executed by the multithreading system 100 may be limited by the length of the program counter register 120. In some other embodiments, however, additional program counter registers 120 may be used, such that a unique program counter is stored in each data element of the set of the program counter registers 120 being used. As a result, the number of possible threads may be extended.

The processor 110 may be configured to activate the various program counters, which are data elements of the program counter register 120, one at a time in a round robin fashion. When a particular program counter is active, it may point to an instruction in the instruction buffer for execution. The other data elements in the program counter register 120 may be ignored until it is their turn to be active in the round robin cycle.

FIG. 1 illustrates a situation in which a first program counter PC[0] in the program counter register 120 indicates, thereby selecting, an instruction in the instruction buffer 130. The selected instruction may be an operation to be performed by the functional unit 140. In this example, the functional unit 140 may take various forms. For example, and not by way of limitation, the functional unit 140 may be a load-store unit, a floating point unit, or some other functional unit configured to operate on the vectors in the vector registers 150. To perform the selected instruction, the functional unit 140 may take as input one or more vectors, each stored in a respective vector register 150. In this example, the functional unit 140 may take two vectors as input, Vector A and Vector B. As a result of performing the operation, the functional unit 140 may generate another vector, Vector C. It will be understood that, although Vector C is illustrated as being distinct from Vectors A and B, depending on the selected instruction, the functional unit 140 may write its result to an input vector instead of writing to a distinct vector as shown.

For each vector register 150, the data elements in the stored vector may each be treated as a scalar value. Thus, in the example of FIG. 1, the functional unit 140 may process a first data element VA[0] in Vector A along with a first data element VB[0] in Vector B, to generate a first data element VC[0] in the resulting Vector C. Analogously, corresponding second elements across the vector register 150 may be processed to produce a resulting second element of Vector C. This may continue until all data elements of the input vectors, Vectors A and B, have been evaluated by the functional unit 140. Because the processor 110 may be configured to address the vector data elements sequentially, rather than simultaneously, this evaluation may be performed separately and in a round robin fashion for each set of corresponding vector elements.

After the instruction referenced by the first program counter PC[0] is evaluated, the first program counter PC[0] may be incremented. Thus, the next time the first program counter is handled, it may point to a new instruction in the instruction buffer 130. The next program counter PC[1] may then become active. In other words, the instruction referenced by the next program counter PC[1] may be performed. The multithreading system 100 may cycle through the various program counters in the program counter register 120 in a round robin fashion, incrementing each program counter after execution of the referenced instruction. As a result, each program counter may represent a distinct thread.

Figure 2:
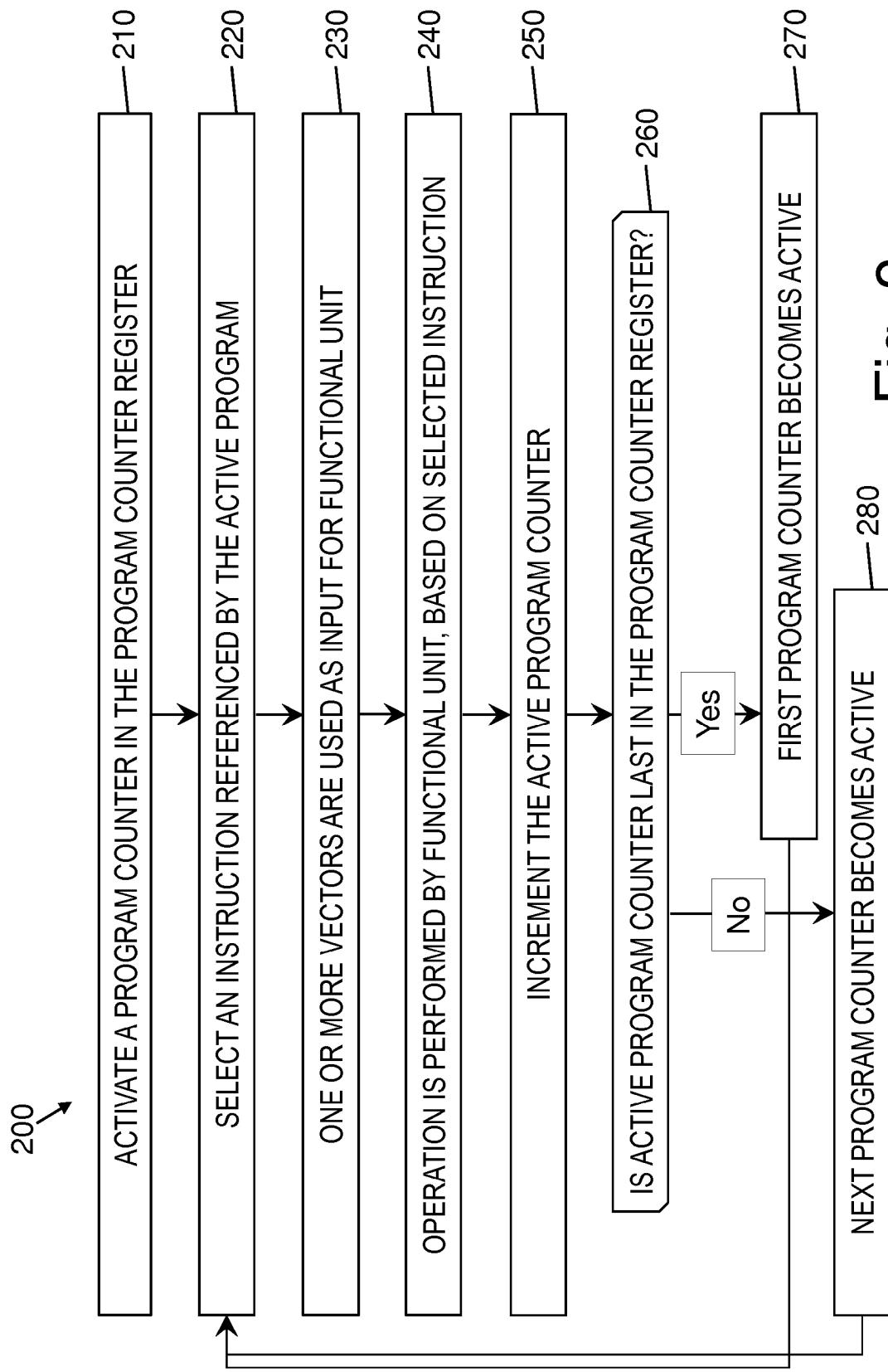
FIG. 2 is a flow diagram of a method for providing multithreading in a vector processor, according to some embodiments of this disclosure.

FIG. 2 is a flow diagram of a method 200 for providing multithreading in a vector processor, according to some embodiments of this disclosure. As shown, at block 210, a program counter may become active in a program counter register 120. At block 220, an instruction referenced by the active program counter may be selected from an instruction buffer 130. At block 230, one or more vectors may be used as input into a functional unit 140. At block 240, based on the selected instruction, the functional unit 140 may process the one or more vectors and may output a result. At block 250, the active program counter may be incremented. At decision block 260, it may be determined whether the active program counter is the last program counter in the program counter register 120. If not, then at block 270, the next program counter may be made active, and the method 200 may return to block 220 to select an instruction. If the program counter is the last data element in the program counter register 120, then at block 280, the first program counter in the program counter register 120 may then become active, and the method 200 may return to block 220 to select an instruction. This loop may continue as long as there are instructions for the processor 110 to perform.

Figure 3:
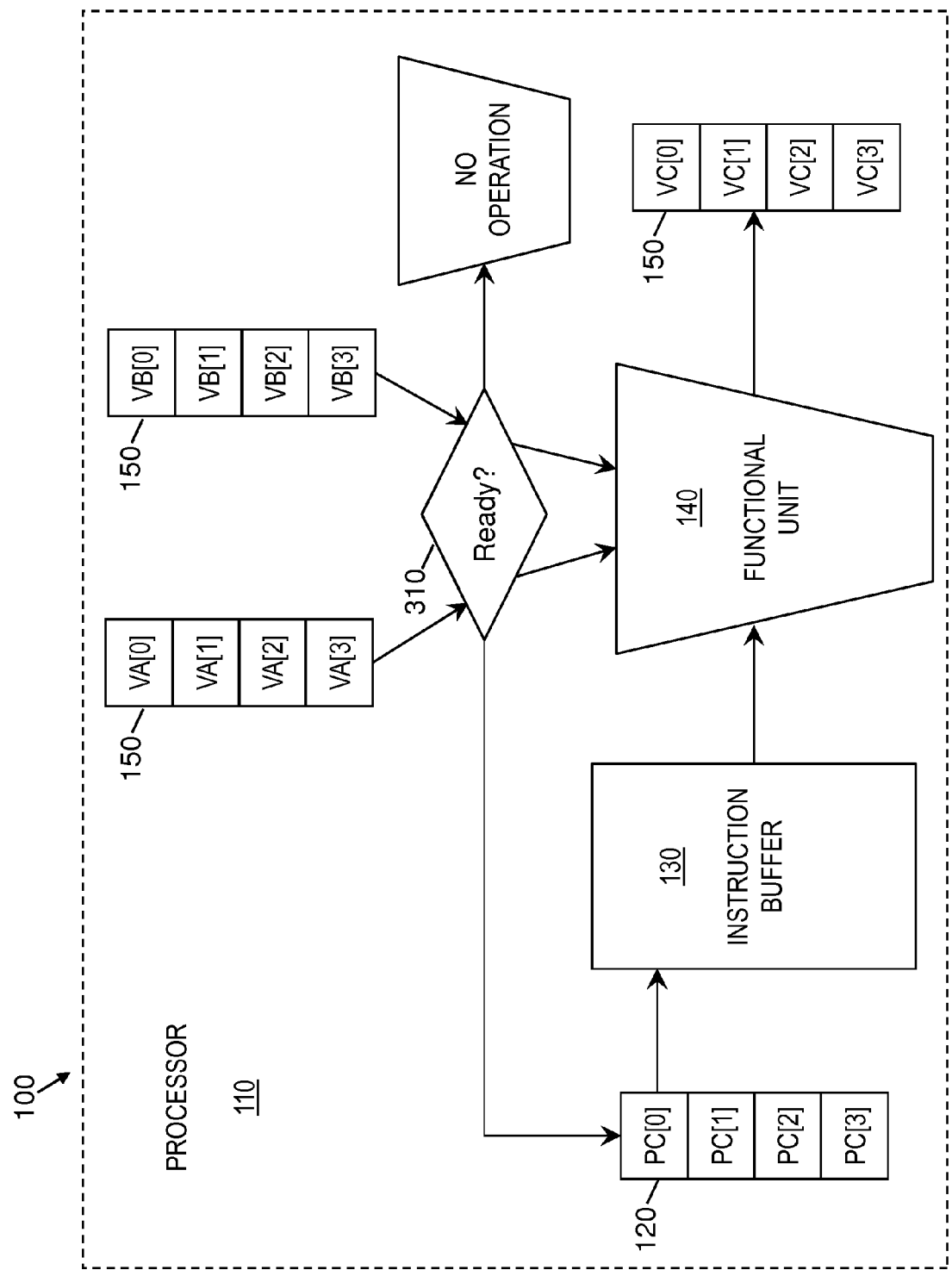
FIG. 3 is a block diagram of a skip operation in the multithreading system, according to some embodiments of this disclosure.

FIG. 3 is a block diagram of a skip operation in the multithreading system 100, according to some embodiments of this disclosure. In some embodiments, the skip operation may be performed to skip execution of a particular thread, so as to avoid a processor stall. A stall might occur of a value of a data element in a vector is not ready (i.e., not valid) when it is needed by an active thread.

The example of FIG. 3 is based on the example of FIG. 1, but further includes an ability to skip a thread during the round robin cycle. A readiness operator 310 may receive data from the input vector registers 150. The readiness operator 310 may determine whether the data elements being operated on are currently ready.

Each data element may include information indicating its readiness. More specifically, in some embodiments, a ready bit may be reserved in each data element for this purpose. The ready bit may have a value of TRUE (e.g., a value of 1) or FALSE (e.g., a value of 0). For instance, this ready bit may be set to FALSE when the data element is invalid, which may be the case if new data is being fetched from memory to be loaded into the data element. The ready bit may then be set to TRUE again when the applicable data has been loaded.

The readiness operator 310 may read the ready bits of the data elements in question and may transfer the data elements to the functional unit 140 if all applicable ready bits indicate readiness (e.g., by being TRUE). Alternatively, if any ready bit of an input data element indicates lack of readiness (e.g., by being to FALSE), then the readiness operator 310 may cause no operation to be performed, and may also ensure that the active program counter is not incremented. As in FIG. 1, the multithreading system 100 may cycle through the various program counters in the program counter register 120. As a result of this skip operation, an active thread corresponding to the active program counter may be skipped in the round robin execution, such that the active program counter remains unchanged, if a necessary data element is invalid.

Figure 4:
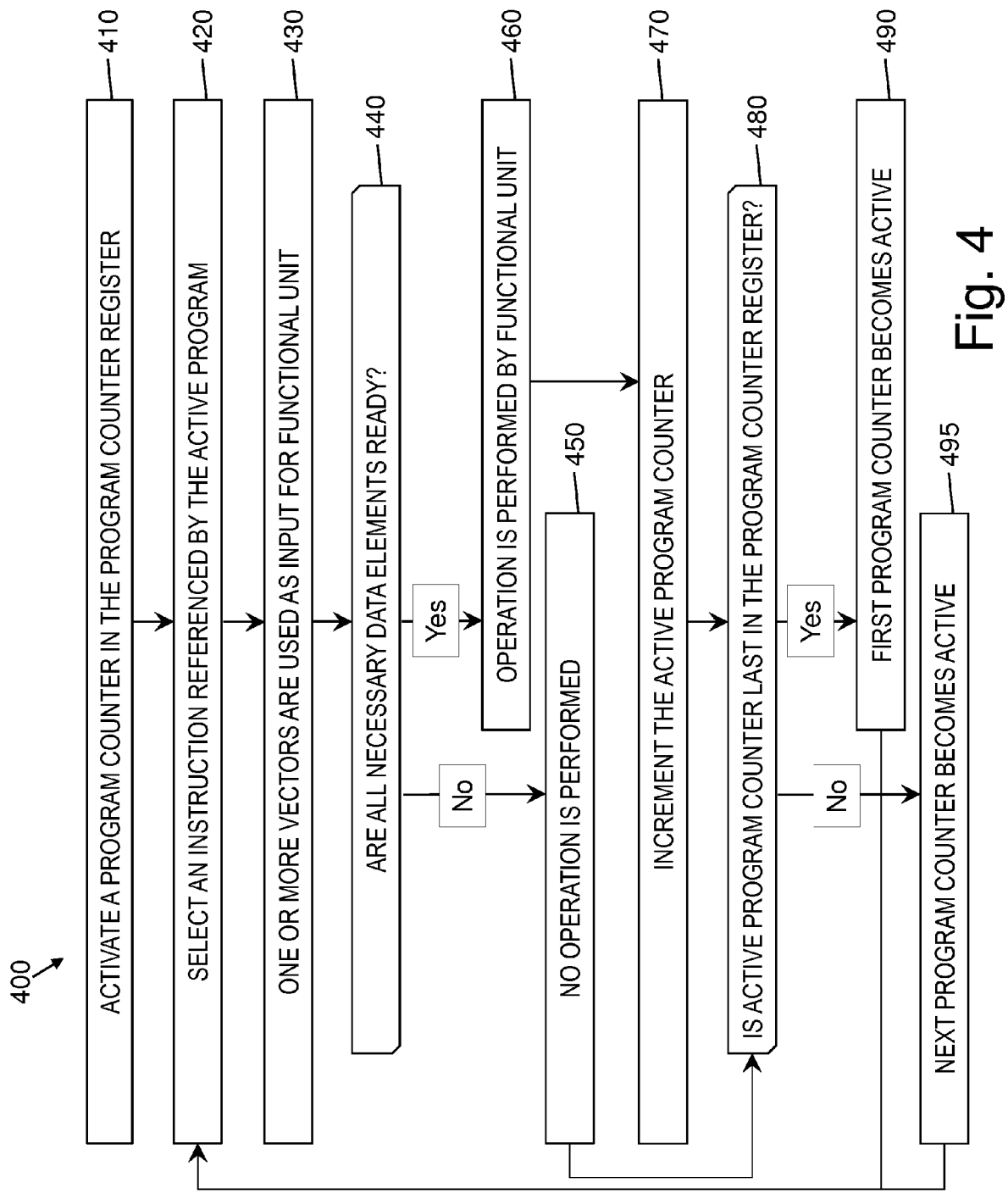
FIG. 4 is a flow diagram of a method for skipping a thread in the multithreading system, according to some embodiments of this disclosure.

FIG. 4 is a flow diagram of a method 400 for skipping a thread in the multithreading system 100, according to some embodiments of this disclosure. As shown, at block 410, a program counter may become active in a program counter register 120. At block 420, an instruction referenced by the active program counter may be selected from the instruction buffer 130. At block 430, one or more vectors may be used as input into a readiness operator 310. At decision block 440, the readiness operator 310 may determine the validity of each data element to be used in an operation for the active thread. If any such data element is deemed to be invalid, then at block 450, no operation may be performed, and the method may proceed to block 480, without incrementing the program counter. If all the data elements are deemed valid, then at block 460, based on the selected instruction, the functional unit 140 may process the one or more vectors and may output a result. At block 470, the active program counter may be incremented. At decision block 480, it may be determined whether the program counter is the last program counter in the program counter register 120. If not, the next program counter may be made active at block 490, and the method 400 may return to block 420 to select an instruction. If the program counter is the last element in the program counter register 120, the first program counter in the register may then become active at block 495, and the method 400 may return to block 420 to select an instruction. This loop may continue as long as there are instructions for the processor 110 to perform.

Figure 5:
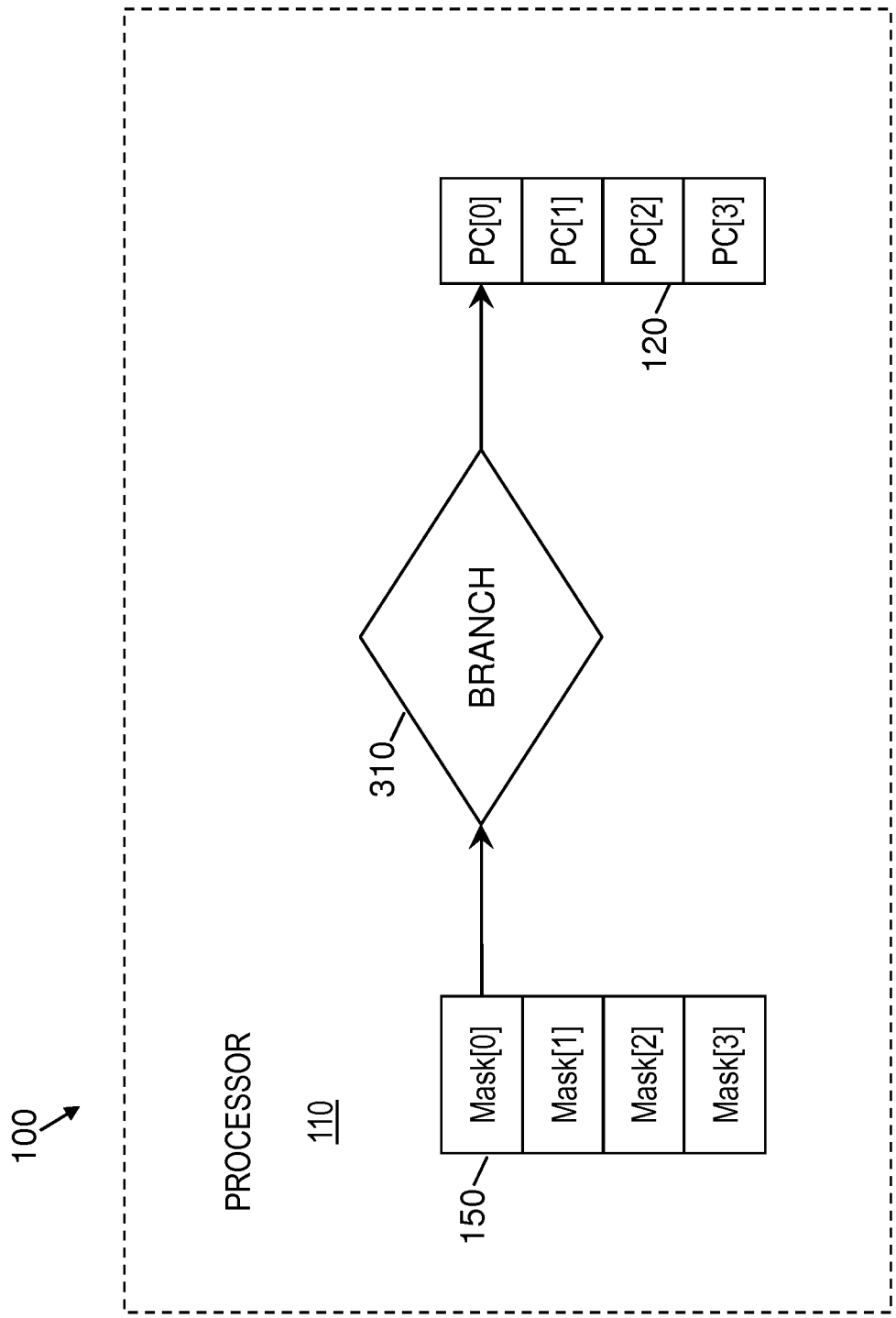
FIG. 5 is a block diagram of a branch operation in the multithreading system, according to some embodiments of this disclosure.

FIG. 5 is a block diagram of a branch operation in the multithreading system 100, according to some embodiments of this disclosure. In contrast to FIG. 5, in a conventional system, a branch operator receives input from a condition register. Based on the value of the condition register, the branch operator modifies the program counter register. In the conventional system, both the condition register and the program counter register are treated as scalars.

Referring back to FIG. 5, in some embodiments, a branch operator 510 may receive vectorized input data and may modify the vectorized program counter register 120 as needed. More specifically, the branch operator 510 may receive a mask register 530 as input. The mask register 530 may contain vectorized data, with each data element being a mask. Each mask may indicate how to modify the corresponding program counter in the program counter register 120. This modification may be, for example, a relative change to the program counter or an absolute change. For example, and not by way of limitation, a value of 10 for a first mask Mask[0] in the mask register 530 may indicate that the corresponding first program counter PC[0] should be incremented by 1000. For another example, a value of 10 for the first mask Mask[0] may indicate a specific value for the corresponding first program counter PC[0]. The branch operator 510 may be configured to evaluate the masks in the mask register 530 to determine how to modify the corresponding program counters in the program counter register 120.

As in the example of FIGS. 1 and 3, the multithreading system may handle each set of corresponding data elements separately. For instance, Mask[0] may be evaluated to modify PC[0]; Mask[1] may be evaluated to modify PC[1], and so on.

Figure 6:
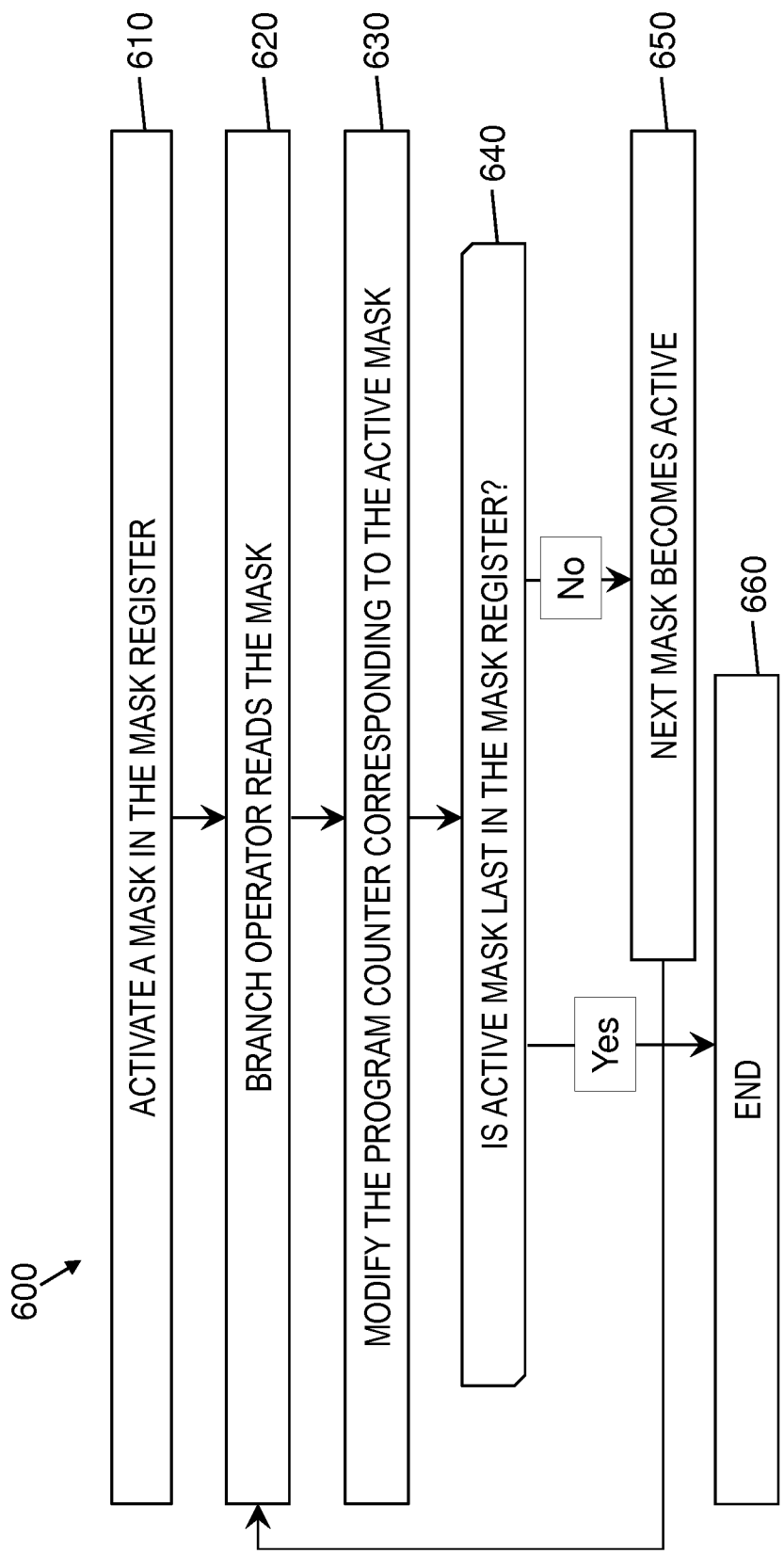
FIG. 6 is a flow diagram of a method for branching in the multithreading system 100, according to some embodiments of this disclosure.

FIG. 6 is a flow diagram of a method 600 for branching in the multithreading system 100, according to some embodiments of this disclosure. As shown, at block 610, a mask may become active in a mask register 530. At block 620, a branch operator 510 may read the mask. At block 630, based on the mask, the branch operator 510 may modify the program counter corresponding to the active mask. At decision block 640, it may be determined whether the active mask is the last mask in the mask register 530. If not, the next mask may be made active, and the method 600 may return to block 620. If the mask is the last data element in the mask register 530, the method 600 for branching may end, with all program counters having been updated as needed.

FIG. 7 is a block diagram of synchronization in the multithreading system 100, according to some embodiments of this disclosure. Synchronization may enable the various threads to wait, until some task has been achieved by the other threads, before moving forward with execution. In the example of FIG. 7, four threads are synchronized, but it will be understood that this quantity is for illustrative purposes only.

As shown in FIG. 7, a synchronization register 710 may be used to synchronize the threads. Before synchronization begins, the synchronization register 710 may be cleared, or set to zero. Clearing the synchronization register may be performed, for example, by a parent thread that existed before the multithreading began.

Each thread may perform an initial task and may then set an assigned bit in the synchronization register, where each thread is assigned a unique bit within the synchronization register 710. Thus, when all threads have performed the task, all assigned bits in the synchronization register will have been set. A summary value 720, which may be a summary bit, may indicate whether all assigned bits in the synchronization register 710 have been set. For example, the summary value 720 may have a value that is a logical AND of all the assigned bits in the synchronization register 710. When the summary value 720 is TRUE, the various threads may then proceed with their further tasks. Thus, all threads may be required to wait for the other threads to complete the initial task before being allowed to move forward.

By using a vectorized program counter, as discussed above, a vector processor may achieve multithreading. For example, a vector processor may have a multithreading mode and a vector processing mode, which it may switch between. In this manner, a vector processor that cannot access vector elements simultaneously may take advantage of the benefits of a multithreading system when in the multithreading mode.

FIG. 8 illustrates a block diagram of a computer system 800 for use in implementing a multithreading system or method according to some embodiments. The multithreading systems and methods described herein may be implemented in hardware, software (e.g., firmware), or a combination thereof. In an exemplary embodiment, the methods described may be implemented, at least in part, in hardware and may be part of the microprocessor of a special or general-purpose computer system 800, such as a personal computer, workstation, minicomputer, or mainframe computer.

In an exemplary embodiment, as shown in FIG. 8, the computer system 800 includes a processor 110, memory 810 coupled to a memory controller 815, and one or more input devices 845 and/or output devices 840, such as peripherals, that are communicatively coupled via a local I/O controller 835. These devices 840 and 845 may include, for example, a printer, a scanner, a microphone, and the like. A conventional keyboard 850 and mouse 855 may be coupled to the I/O controller 835. The I/O controller 835 may be, for example, one or more buses or other wired or wireless connections, as are known in the art. The I/O controller 835 may have additional elements, which are omitted for simplicity, such as controllers, buffers (caches), drivers, repeaters, and receivers, to enable communications.

The I/O devices 840, 845 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 110 is a hardware device for executing hardware instructions or software, particularly vector instructions stored in memory 810. The processor 110 may be a custom made or commercially available processor, a central processing unit (CPU), an auxiliary processor among several processors associated with the computer system 800, a semiconductor based microprocessor (in the form of a microchip or chip set), a macroprocessor, or other device for executing instructions. The processor 110 includes a cache 870, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 870 may be organized as a hierarchy of more cache levels (L1, L2, etc.).

The memory 810 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 810 may incorporate electronic, magnetic, optical, or other types of storage media. Note that the memory 810 may have a distributed architecture, where various components are situated remote from one another but may be accessed by the processor 110.

The instructions in memory 810 may include one or more separate programs, each of which comprises an ordered listing of executable instructions for implementing logical functions. In the example of FIG. 8, the instructions in the memory 810 include a suitable operating system (OS) 811. The operating system 811 essentially may control the execution of other computer programs and provides scheduling, input-output control, file and data management, memory management, and communication control and related services.

Additional data, including, for example, instructions for the processor 110 or other retrievable information, may be stored in storage 820, which may be a storage device such as a hard disk drive or solid state drive. The stored instructions in memory 810 or in storage 820 may include those enabling the processor to execute one or more aspects of the multithreading systems and methods of this disclosure.

The computer system 800 may further include a display controller 825 coupled to a display 830. In an exemplary embodiment, the computer system 800 may further include a network interface 860 for coupling to a network 865. The network 865 may be an IP-based network for communication between the computer system 800 and an external server, client and the like via a broadband connection. The network 865 transmits and receives data between the computer system 800 and external systems. In an exemplary embodiment, the network 865 may be a managed IP network administered by a service provider. The network 865 may be implemented in a wireless fashion, e.g., using wireless protocols and technologies, such as WiFi, WiMax, etc. The network 865 may also be a packet-switched network such as a local area network, wide area network, metropolitan area network, the Internet, or other similar type of network environment. The network 865 may be a fixed wireless network, a wireless local area network (LAN), a wireless wide area network (WAN) a personal area network (PAN), a virtual private network (VPN), intranet or other suitable network system and may include equipment for receiving and transmitting signals.

Multithreading systems and methods according to this disclosure may be embodied, in whole or in part, in computer program products or in computer systems 800, such as that illustrated in FIG. 8.

Technical effects and benefits of some embodiments include the ability to effectively provide a multithreading environment from a vector processor that handles vector data elements sequentially. Thus, in some embodiments, an older vector processor may be converted to a multithreading mode.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a processor having a vector processing mode and a multithreading mode, the processor being a vector processor and being configured to operate on one thread per cycle in the multithreading mode, and the processor comprising:
one or more program counter registers together comprising a plurality of program counters, each program counter register of the one or more program counter registers being vectorized into a corresponding subset of the plurality of program counters, and each program counter in the plurality of program counters of one or more program counter registers representing a distinct corresponding thread of a plurality of threads;
wherein the number of threads in the plurality of threads is limited by the number of program counters in the plurality of program counters of the one or more program counter registers;
the processor configured to execute the plurality of threads by activating the plurality of program counters in a round robin cycle;
an instruction buffer comprising a plurality of instructions;
wherein a first program counter in the plurality of program counters references a first instruction in the instruction buffer for execution by the processor in a first thread of the plurality of threads;
wherein a second program counter in the plurality of program counters references a second instruction in the instruction buffer for execution by the processor in a second thread of the plurality of threads, the first instruction being different from the second instruction;
wherein the processor is configured to skip, in the round robin cycle, a program counter lacking readiness based on a ready bit setting and determine a validity of each data element to be used in an operation for an active thread of the plurality of threads, said validity indicative of data being fetched from memory to be loaded into a data element, wherein responsive to a determination of an invalid operation, proceed to a next operation without incrementing the second program counter, and responsive to no invalid operation, process one or more output vectors and output a result.

2. The system of claim 1, the processor further comprising:
a branch operator configured to modify the plurality of program counters in the program counter registers; and
a mask register comprising a plurality of masks, wherein each mask in the mask register corresponds to a program counter in the one or more program counter registers;
wherein the branch operator is configured to modify, in the round robin cycle, each program counter in the program counter registers based on the value of the corresponding mask in the mask register.

3. The system of claim 1, the processor further comprising:
a readiness operator configured to determine validity of a plurality of data elements in a vector related to an operation;
wherein an active program counter is skipped, responsive to a data element in the vector being invalid.

4. The system of claim 1, the processor further comprising:
a synchronization register configured to indicate whether the plurality of threads have performed an initial task, wherein each of the plurality of threads is configured to set a corresponding bit in the synchronization register responsive to performing the initial task; and
wherein the plurality of threads are configured to pause their execution until the corresponding bits to the plurality of threads are set.

5. The system of claim 1, wherein the processor is configured to switch between the multithreading mode and the vector processing mode.

6. A computer-implemented method, comprising:
storing, via a vector processor having a vector processing mode and a multithreading mode and configured to operate on one thread per cycle in the multithreading mode, in one or more program counter registers together comprising a plurality of program counters;
vectorizing one or more program counter registers that together comprise a plurality of program counters, into a corresponding subset of the plurality of program counters, wherein each program counter in the plurality of program counter registers represents a distinct corresponding thread of a plurality of threads;
wherein the number of threads in the plurality of threads is limited by the number of program counters in the plurality of program counters of the one or more program counter registers;
executing, by a processor, the plurality of threads by activating the plurality of program counters in a round robin cycle;
referencing, via a first program counter in the plurality of program counters, a first instruction in an instruction buffer for execution by the processor in a first thread of the plurality of threads, wherein the instruction buffer comprises a plurality of instructions;
referencing, via a second program counter in the plurality of program counters, a second instruction in an instruction buffer for execution by the processor in a second thread of the plurality of threads, the first instruction being different from the second instruction; and
skipping, via the processor, in the round robin cycle, a program counter lacking readiness based on a ready bit setting and determine a validity of each data element to be used in an operation for an active thread of the plurality of threads, said validity indicative of data being fetched from memory to be loaded into a data element, the skipping comprising:
responsive to a determination of an invalid operation, proceeding to a next operation without incrementing the second program counter, and
responsive to no invalid operation, processing one or more output vectors and output a result.

7. The method of claim 6, further comprising a mask register comprising a plurality of masks, wherein each mask in the mask register corresponds to a program counter in the plurality of program counter registers, the method further comprising:

modifying, in the round robin cycle, each program counter in the plurality of program counter registers based on a value of a corresponding mask in the mask register.

8. The method of claim 6, further comprising:
determining validity of a plurality of data elements in a vector related to an operation; and
skipping an active program counter, responsive to a data element in the vector being invalid.

9. The method of claim 6, further comprising:
setting, by each of the plurality of threads, an assigned bit in a synchronization register responsive to performing an initial task
pausing, by each of the plurality of threads, execution until a plurality of assigned bits for the plurality of threads are set in the synchronization register.

10. The method of claim 6, wherein the computer processor is configured to switch between the multithreading mode and the vector processing mode.

11. A computer program product for multithreading in a vector processor, the computer program product comprising a computer readable storage medium having program instructions embodied therewith, the program instructions executable by a vector processor having a vector processing mode and a multithreading mode and configured to operate on one thread per cycle in the multithreading mode, to cause the vector processor to perform a method comprising:

storing, in one or more program counter registers together comprising a plurality of program counters;
vectorizing one or more program counter registers that together comprise a plurality of program counters, into a corresponding subset of the plurality of program counters, wherein each program counter in the plurality of program counter registers represents a distinct corresponding thread of a plurality of threads;
wherein the number of threads in the plurality of threads is limited by the number of program counters in the plurality of program counters of the one or more program counter registers;
executing the plurality of threads by activating the plurality of program counters in a round robin cycle;
referencing, via a first program counter in the plurality of program counters, a first instruction in an instruction buffer for execution by the processor in a first thread of the plurality of threads, wherein the instruction buffer comprises a plurality of instructions;
referencing, via a second program counter in the plurality of program counters, a second instruction in an instruction buffer for execution by the processor in a second thread of the plurality of threads, the first instruction being different from the second instruction; and
skipping, in the round robin cycle, a program counter lacking readiness based on a ready bit setting and determine a validity of each data element to be used in an operation for an active thread of the plurality of threads, said validity indicative of data being fetched from memory to be loaded into a data element, the skipping comprising:
responsive to a determination of an invalid operation, proceeding to a next operation without incrementing the second program counter, and
responsive to no invalid operation, processing one or more output vectors and output a result.

12. The computer program product of claim 11, wherein a mask register comprises a plurality of masks, and wherein each of the plurality of masks in the mask register corresponds to a program counter in the plurality of program counter registers, the method further comprising:
modifying, in the round robin cycle, each program counter in the program counter registers based on a value of a corresponding mask in the mask register.

13. The computer program product of claim 11, the method further comprising:
determining validity of a plurality of data elements in a vector related to an operation; and
skipping an active program counter, responsive to a data element in the vector being invalid.

14. The computer program product of claim 11, the method further comprising:
setting, by each of the plurality of threads, an assigned bit in a synchronization register responsive to performing an initial task
pausing, by each of the plurality of threads, execution until a plurality of assigned bits for the plurality of threads are set in the synchronization register.

15. The computer program product of claim 11, wherein the processor is configured to switch between the multithreading mode and the vector processing mode.

* * * * *